(12) United States Patent
Clark et al.

(10) Patent No.: US 7,513,754 B2
(45) Date of Patent: Apr. 7, 2009

(54) SHEET METAL SUPPORT FOR A FURNACE BLOWER

(75) Inventors: Tony Michael Clark, Wichita, KS (US); Tabraiz Ali Khan, Wichita, KS (US)

(73) Assignee: York International Corporation, York, PA (US)

( * ) Notice: Subject to any disclaimer, the term of this patent is extended or adjusted under 35 U.S.C. 154(b) by 717 days.

(21) Appl. No.: 10/832,162

(22) Filed: Apr. 26, 2004

(65) Prior Publication Data

US 2004/0197208 A1  Oct. 7, 2004

Related U.S. Application Data

(62) Division of application No. 09/879,203, filed on Jun. 13, 2001, now Pat. No. 6,761,343.

(51) Int. Cl.
*F04B 17/03* (2006.01)
*F16M 1/00* (2006.01)

(52) U.S. Cl. .................. 417/360; 417/423.15; 248/674; 248/300; 248/903

(58) Field of Classification Search ............... 417/360, 417/423.15; 248/603, 604, 659, 674, 675, 248/903, 300; 310/91
See application file for complete search history.

(56) References Cited

U.S. PATENT DOCUMENTS

| | | | |
|---|---|---|---|
| 2,074,136 A | 3/1937 | Welch | |
| 2,451,970 A | 10/1948 | Odor | |
| 2,731,193 A * | 1/1956 | Lall et al. | 417/423.15 |
| 3,145,960 A | 8/1964 | Langdon | |
| 3,516,627 A | 6/1970 | Gable et al. | |
| 3,601,502 A | 8/1971 | Harter | |
| 3,627,248 A | 12/1971 | Nelson | |
| 3,775,029 A | 11/1973 | Ranz | |
| 3,830,595 A | 8/1974 | Carpenter et al. | |
| 4,220,880 A | 9/1980 | Woodard | |
| 4,441,684 A | 4/1984 | Credle, Jr. | |
| 4,492,357 A | 1/1985 | Morrill | |
| 4,568,243 A | 2/1986 | Schubert et al. | |
| 4,572,472 A | 2/1986 | Eder | |
| 4,597,555 A * | 7/1986 | Weihsmann | 248/672 |
| 4,787,818 A | 11/1988 | Bales et al. | |
| 5,290,005 A | 3/1994 | Akiyama et al. | |
| 5,395,079 A | 3/1995 | Jensen | |
| 5,417,401 A * | 5/1995 | Thompson et al. | 248/674 |
| 5,470,207 A | 11/1995 | Shockey et al. | |
| 5,492,456 A * | 2/1996 | Knight et al. | 417/360 |
| 5,566,919 A | 10/1996 | Shephard | |
| 5,622,485 A | 4/1997 | Stewart | |
| 5,855,354 A | 1/1999 | Fisher et al. | |
| 6,011,336 A | 1/2000 | Mathis et al. | |
| 6,341,949 B1 * | 1/2002 | Garloch | 417/363 |

\* cited by examiner

*Primary Examiner*—Charles G Freay
(74) *Attorney, Agent, or Firm*—McNees Wallace & Nurick, LLC

(57) ABSTRACT

A motor mount constructed from a single piece of sheet metal. The motor mount contains a band portion and at least three leg portions. The band portion clamps around a motor and the leg portions radiate from the band portion. The leg portions secure the motor to a housing.

14 Claims, 4 Drawing Sheets

SHEET METAL SUPPORT FOR A FURNACE BLOWER

The application is a divisional of application Ser. No. 09/879,203 filed Jun. 13, 2001, which issued as U.S. Pat. No. 6,761,343 on Jul. 13, 2004.

BACKGROUND OF THE INVENTION

The present invention relates generally to a motor mount. In particular, the invention relates to the use of a single-piece motor mount in a blower assembly for a furnace.

In most homes, the furnace contains a blower assembly and heating and/or cooling elements, such as an A-Coil. The blower assembly pulls air into the furnace by means of a return air ductwork and forces the air over the heating or cooling elements. The blower then returns the air to the home by means of ductwork contained within the walls, floor, basement, and/or attic of the home.

The blower assembly typically consists of a housing, a blower wheel, an electric motor, and a motor mount. The blower wheel comprises a plurality of vanes and is attached to the shaft of the electric motor. When the blower wheel rotates, the vanes cause the air to move outwardly from the blower wheel. The housing surrounds the blower wheel and directs the flow of air created by the rotation of the blower wheel. The motor mount maintains the electric motor in the proper position relative to the housing.

Typically, the motor mount comprises a steel clamp that wraps around and is fixed to the body of the motor and a plurality of support legs connected to the clamp to attach the motor to the housing. In some cases, the support legs and clamp are separate pieces, which are welded together prior to being connected to the assembly. In other cases, the support legs are welded or screwed directly to the motor. These welds or screws are the most common failure points of these motor mounts.

SUMMARY OF THE INVENTION

The present invention is a motor mount made from a single piece of sheet metal. The sheet metal is shaped to define a continuous band portion along one side of the sheet metal. At least three leg portions project from the band portion. Each leg portion is capable of being bent generally perpendicular to the band portion, so that when the band portion is placed around a circular motor, the legs radiate from the band portion.

In one embodiment of the motor mount, the band portion contains at least three curved ribs on the band portion to add strength to the motor mount. Each rib is preferably located generally perpendicular to the length of the band and proximate to one of the leg portions.

In another embodiment, each leg portion includes a base portion joined to the band portion. In that embodiment, one side of the base portion has an undercut to facilitate bending the leg portion perpendicular to the band portion. Further, the undercut and the point at which the other side of each base portion and the band portion are joined can be generally curved to reduce stress in the motor mount. In addition, each leg portion may also include a fastening portion capable of being bent generally perpendicular to the leg portions to fasten the motor mount to a housing. In another embodiment, the leg portions are equally spaced along the length of the band portion.

The present invention is also directed to a blower assembly. The blower assembly includes an electric motor, a blower wheel, a plurality of vanes, a housing, a motor mount, and fasteners. The vanes are attached to the blower wheel, which in turn is attached to the motor. The motor rotates the blower wheel creating a flow of air in the assembly. The housing surrounds the blower wheel to direct the flow of air. The motor mount includes a single piece of sheet metal shaped to define a continuous band portion along one side. The motor mount also includes at least three leg portions projecting from the band portion. Each leg portion is capable of being bent generally perpendicular to the band portion, so that when the band portion is placed around a circular motor, the legs radiate from the band portion. Finally, the fasteners attach the leg portions to the housing.

In one embodiment, each leg portion includes a fastening portion capable of being bent generally perpendicular to the leg portions. Fasteners connect each fastening portion to the motor housing. In another embodiment, the fasteners include a shock absorbing means.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present preferred embodiments of the invention, an example of which is illustrated in the accompanying drawings. Wherever possible, the same reference numbers will be used throughout the drawings to refer to the same or like parts.

Figure 1:
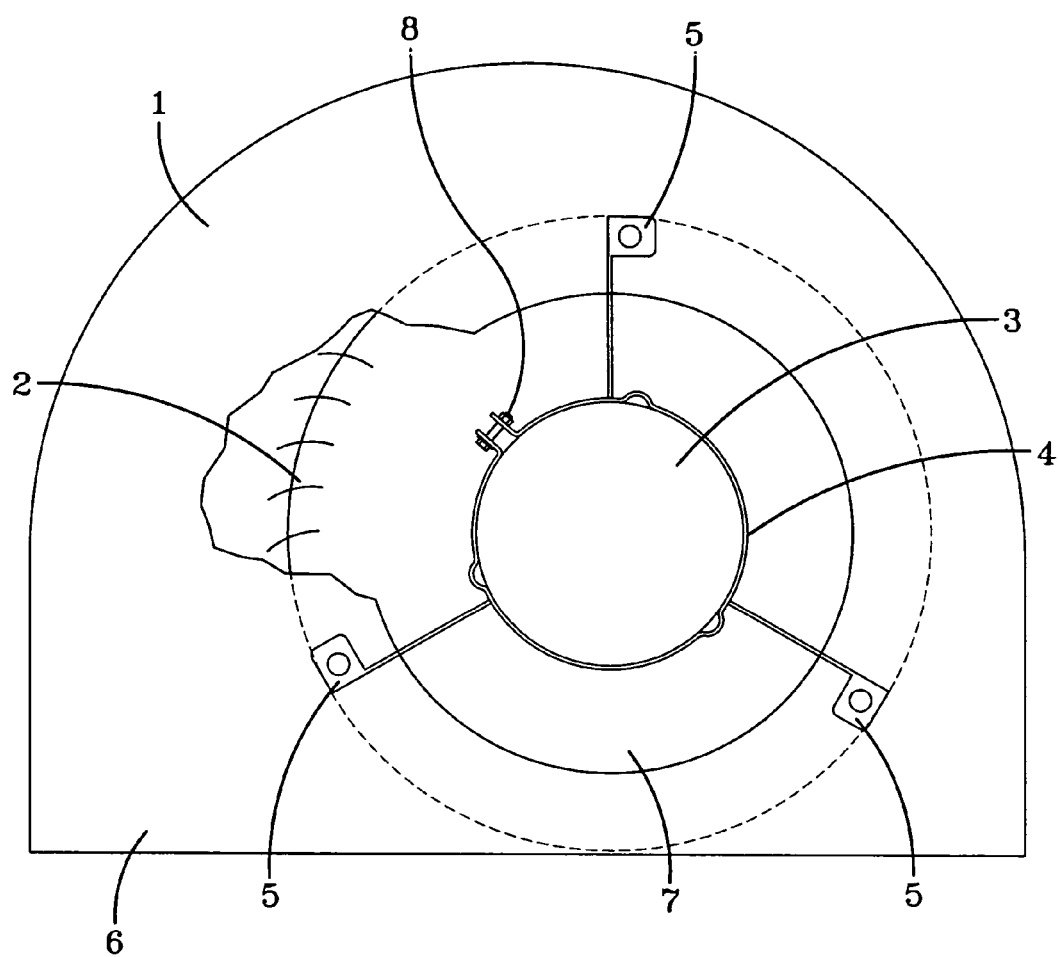
FIG. 1 is a side view of a blower assembly of the present invention.

FIG. 1 is a side view of a blower assembly of the present invention. The blower assembly consists of a blower housing 1, an electric motor 3, and a motor mount 8 constructed from a single piece of material. The motor mount 8 holds the motor 3 in position relative to the blower housing 1. The motor mount 8 comprises a band portion 4, which clamps around the motor 3. The motor mount 8 also comprises leg portions 5, which fasten the motor 3 to the blower housing 1. During operation, the electric motor 3 rotates a blower wheel 2, which contains a plurality of vanes. The rotation of these vanes draws air into the blower inlet 7 and forces the air out of the blower outlet 6. The motor 3 can be any one of a number of commercially available motors with a generally circular cross-section.

The blower assembly can be utilized in any one of a number of systems utilizing a blower to direct the flow of air. In the preferred embodiment, the blower assembly is used in any one of a number of commercially available furnaces in which a blower is used to draw air into the furnace, force the air over a heating or cooling element and return the air to a home.

The motor mount 8 of the present invention preferably is constructed from a single piece of sheet metal. The motor mount 8 consists of a band portion 4 and leg portions 5. The band portion 4 will be clamped around the circumference of a motor. The size of the band portion 4 can vary to accommodate motors of different circumference and shape. The leg portions 5 will attach the motor to a motor housing, or other support surface. The motor mount 8 preferably includes at least three equally spaced leg portions 5 for proper stability. The size, shape, and number of these leg portions 5 could be varied to attach to various types of blower housings or other supports.

Figure 2:
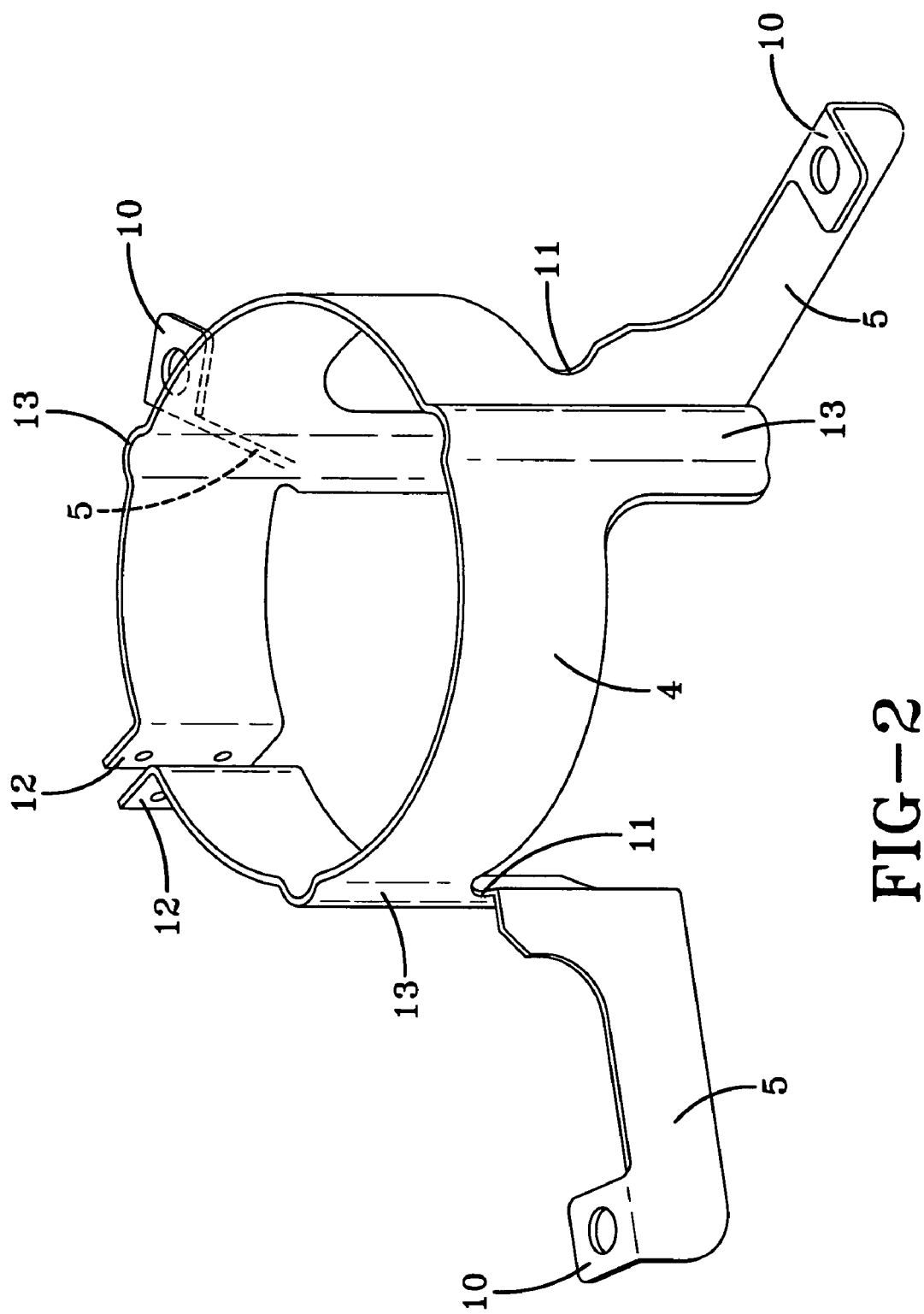
FIG. 2 is a perspective view of one embodiment of the motor mount of the present invention.
Figure 3:
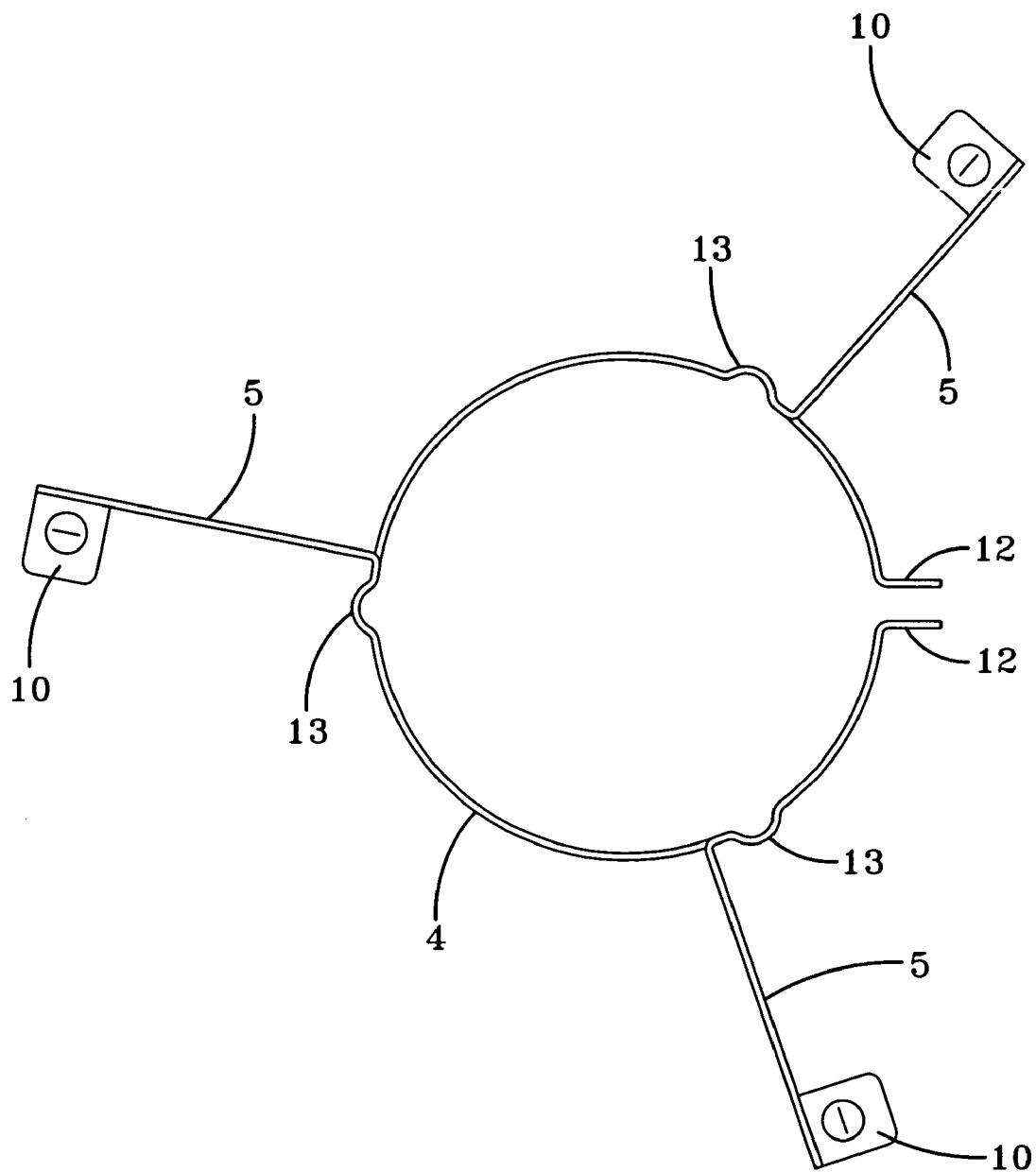
FIG. 3 is a top view of one embodiment of the motor mount of the present invention.
Figure 4:
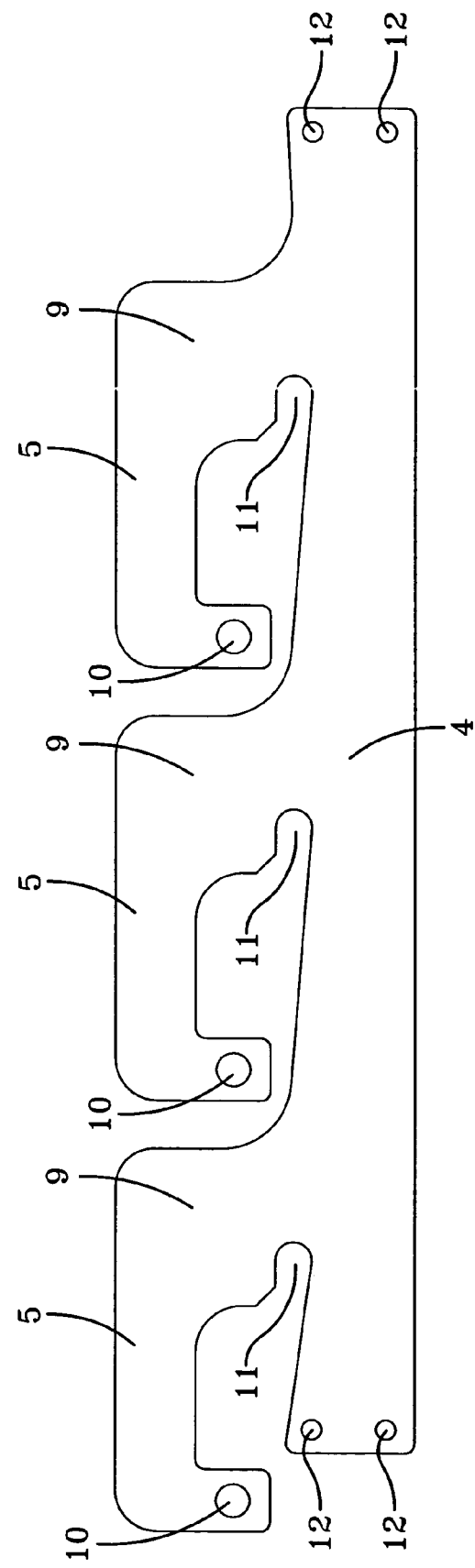
FIG. 4 is a side view of one embodiment of the motor mount of the present invention after being cut to the desired pattern, but prior to being formed into its final shape.

FIGS. 2 and 3 illustrate one embodiment of the motor mount 8 of the present invention. FIG. 4 illustrates this embodiment of the motor mount 8 after being cut to the desired pattern, but prior to being formed into its final shape.

The motor mount 8 of this embodiment comprises a band portion 4 and three identical leg portions 5. The band portion 4 is generally rectangular in shape and has a length several times that of its height. The size and shape of the band portion 4 can vary to accommodate different sized motors. For example, in the embodiment in FIG. 4, the top edge of the band portion is slanted in between each leg portion.

In order to clamp the band portion 4 around a motor, the band includes a mechanical connection area. In the illustrated embodiment, two holes 12 are formed on each end of the band portion 4. As shown in FIGS. 2 and 3, when the band portion 4 is bent into a generally circular shape, the ends of the band portion 4 are further bent so as to be parallel to one another. Fastening means, such as screws, extend through the holes and connect the two ends of the band portion 4, thereby clamping the band portion around a motor.

In the illustrated embodiment, the motor mount 8 also includes three identical leg portions 5. Each leg portion includes a base portion 9, which is joined to the band portion 4, and a fastening portion 10 to connect the motor mount to a housing. One side of the base portion 9 contains an undercut 11. This undercut 11 facilitates bending the leg portion perpendicular to the band portions. In the embodiment shown in FIG. 4, the undercut 11 is generally curved to reduce the stress in the motor mount 8. Other portions of the mount are also curved, to reduce stress. For example, the base portion 9 is generally curved where it joins with the band portion 4 and is also curved where it joins with the elongated leg portions 5.

Each leg portion further includes a fastening portion 10 and Is curved where the elongated leg portion 5 joins the fastening portion. When the motor mount is formed, the fastening portion 10 is bent perpendicular to the leg portion. In the embodiment shown in FIG. 4, these fastening portions extend downwardly and when formed are positioned intermediate the top and bottom surfaces of the leg and band portions. However, the fastening portions also could be formed to extend upward beyond the top of the leg portions, so that when formed they would be at the outside edge of the leg portion 5.

In the illustrated embodiment, the band portion also contains three identical ribs 13 located adjacent to the leg portions 5. As shown, these ribs extend along substantially the entire height of the band and leg portions. In one embodiment, the ribs have a generally semicircular shape with a radius of approximately 0.25 inches. The ribs primarily add strength to the mount. While this embodiment utilizes three ribs, it should be understood that any number of ribs could be formed in the motor mount.

As an example only, in one embodiment, after being cut to the desired pattern, but before being formed in to its final shape, the length of the band portion 4 is approximately 17.969 inches. In this example, the height of the band portion 4 varies from approximately 1.375 inches at the point where the undercut 11 joins the band portion 4, to a height of 1.625 inches where the band portion 4 joins with the base portion 9 of the leg portion 5, and to a height of 1.750 inches at both ends of the band portion 4.

In this exemplary embodiment, each leg portion has a length of approximately 5.094 inches, and the distance from the top edge of each leg portion 5 to the bottom edge of the band portion 4 is approximately 4.000 inches. The base portion of the first leg portion joins with the band portion 4 approximately 1.344 inches from the first end of the band portion. Each base portion is generally curved at this point with a radius of approximately 1.000 inch. The opposite side of each base portion joins with the band portion 4 at an undercut 11. In the base portion of the first leg portion, this juncture occurs approximately 3.812 inches from the first end of the base portion. The base portion of the second leg portion joins with the band portion 4 approximately 7.125 inches from the first end of the band portion. The opposite side of this base portion joins with the band portion 4 at an undercut 11, approximately 9.594 inches from the first end of the base portion. Finally, the base portion of the third leg portion joins with the band portion 4 approximately 12.906 inches from the first end of the band portion. The opposite side of this base portion joins with the band portion 4 at an undercut 11, approximately 15.375 inches from the first end of the base portion. Therefore, in this exemplary embodiment, each leg portion is spaced approximately 3.312 inches apart.

A number of methods can be used to construct the motor mount 8. In one method, a piece of sheet metal is punched and trimmed to form the desired pattern. This punching or trimming could be done by hand or mechanically with a die press. In addition to creating the desired shape, this process could punch all the required holes in the motor mount and punch the ribs into the motor mount. The pattern would then be formed into the desired shape for the motor mount 8 either mechanically or by hand. This could be done in a variety of stages, such that a portion of the motor mount would be formed at each stage.

In another method, a continuously fed die press could be used. In this method, a coil of sheet metal would be fed into a specially created dye containing a number of stages. At each stage, the die would be pressed down on the sheet metal both cutting a portion of the desired pattern and forming a portion of the motor mount into its desired shape. At the end of all the stages, the motor mount would be completely formed including all holes and ribs. Other known methods can be used provided the motor mount 8 is constructed from a single piece of material.

A fastener, such as a screw, is used to connect the fastening portion 10 to a motor housing. In the preferred embodiment, a shock absorber, such as a rubber grommet, would be situated between the fastening portion 10 and the motor housing to reduce noise caused by the vibration of the motor. A metal sleeve or ferrule would also be used in conjunction with the grommet to secure the motor housing.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A blower assembly, comprising:
an electric motor having a first end and a second end opposite the first end;
a blower wheel connected to a shaft of the motor at the first end of the motor, the blower wheel comprising a plurality of vanes, wherein rotation of the blower wheel and the plurality of vanes by the motor generates a flow of air;
a housing surrounding the blower wheel to direct the flow of air;
a motor mount comprising a band portion disposed around the motor between the first end and the second end of the motor and at least three equally spaced leg portions projecting substantially perpendicularly from the band portion, the band portion and the at least three leg portions being formed from a single piece of sheet metal, the band portion comprising at least three curved ribs to add strength to the motor mount and each rib extends substantially perpendicular to a length of the band portion and is located proximate to one of the leg portions; and
a plurality of fasteners configured and disposed to attach the at least three leg portions to the housing.

2. The blower assembly of claim 1, wherein each leg portion of the at least three leg portions comprises a fastening portion disposed substantially perpendicular to the leg portion and connected to the housing by at least one fastener of the plurality of fasteners.

3. The blower assembly of claim 2, further comprising a shock absorber disposed between each fastening portion and the housing.

4. The blower assembly of claim 1, wherein the band portion comprises a first end and a second end opposite the first end and each end of the band portion comprises a means for clamping the band portion about the motor.

5. The blower assembly of claim 4, wherein the means for clamping the band portion about the motor at each end of the band portion comprises a mechanical connection area.

6. A blower assembly for a furnace, the blower assembly comprising:
an electric motor having a first end and a second end opposite the first end;
a blower wheel connected to the first end of the motor, the blower wheel comprising a plurality of vanes, wherein rotation of the blower wheel and the plurality of vanes by the motor generates a flow of air;
a housing surrounding the blower wheel to direct the flow of air;
a motor mount to hold the motor in position in the housing, the motor mount comprising:
a band portion comprising a first end and a second end disposed adjacent to the first end and having a substantially cylindrical shape, the band portion being disposed in contact with the motor between the first end of the motor and the second end of the motor to hold the motor;
at least three leg portions, each leg portion of the at least three leg portions being continuous with the band portion and comprising a leg extending substantially perpendicularly from the band portion;
wherein the band portion and the at least three leg portions are formed from a single sheet of material; and
wherein a width of the band portion is variable between the first end and the second end of the band portion; and
a plurality of fasteners configured and disposed to connect the at least three leg portions to the housing.

7. The blower assembly of claim 6 wherein each leg portion of the at least three leg portions comprises a curved undercut near the band portion to reduce stress in the motor mount.

8. The blower assembly of claim 6 wherein each leg portion of the at least three leg portions comprises a base portion disposed substantially perpendicular to the corresponding leg of the leg portion, the base portion having a substantially curved shape near the band portion and the corresponding leg to reduce stress in the motor mount.

9. The blower assembly of claim 8 wherein each leg portion of the at least three leg portions comprises a fastening portion disposed substantially perpendicular to the leg to fasten the motor mount to the housing.

10. The blower assembly of claim 6 wherein the at least three leg portions are disposed substantially equidistant from one another.

11. The blower assembly of claim 6 wherein the first end and the second end of the band portion each comprises a connection area, the connection area of the first end of the band portion is connected to the connection area of the second end of the band portion to place the band portion in contact with the motor to secure the motor in the band portion.

12. A blower assembly, comprising:
an electric motor having a first end and a second end opposite the first end;
a blower wheel connected to a shaft of the motor at the first end of the motor, the blower wheel comprising a plurality of vanes, wherein rotation of the blower wheel and the plurality of vanes by the motor generates a flow of air;
a housing surrounding the blower wheel to direct the flow of air;
a motor mount comprising a band portion disposed around the motor between the first end and the second end of the motor and at least three equally spaced leg portions projecting substantially perpendicularly from the band portion, the band portion and the at least three leg portions being formed from a single piece of sheet metal;
a plurality of fasteners configured and disposed to attach the at least three leg portions to the housing; and
the motor mount comprising a base portion for each leg portion of the at least three leg portions, each base portion being configured and disposed to join the band portion and a corresponding leg portion, and an edge of the band portion is slanted between each base portion.

13. The blower assembly of claim 12, wherein each base portion has a substantially curved shape near the band portion and the corresponding leg portion to reduce stress in the motor mount.

14. A blower assembly for a furnace, the blower assembly comprising:
an electric motor having a first end and a second end opposite the first end;
a blower wheel connected to the first end of the motor, the blower wheel comprising a plurality of vanes, wherein rotation of the blower wheel and the plurality of vanes by the motor generates a flow of air;
a housing surrounding the blower wheel to direct the flow of air;
a motor mount to hold the motor in position in the housing, the motor mount comprising:

a band portion comprising a first end and a second end disposed adjacent to the first end and having a substantially cylindrical shape, the band portion being disposed in contact with the motor between the first end of the motor and the second end of the motor to hold the motor, the band portion further comprising at least three curved ribs formed in the band portion to strengthen the motor mount;

at least three leg portions, each leg portion of the at least three leg portions being continuous with the band portion and comprising a leg extending substantially perpendicularly from the band portion;

wherein the band portion and the at least three leg portions are formed from a single sheet of material; and wherein each rib extending across a width of the band portion and being disposed adjacent to one leg portion of the at least three leg portions; and a plurality of fasteners configured and disposed to connect the at least three leg portions to the housing.

* * * * *